(12) United States Patent
Akimoto

(10) Patent No.: US 10,477,112 B2
(45) Date of Patent: Nov. 12, 2019

(54) DISPLAY CONTROL APPARATUS DISPLAYING IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yasuhiro Akimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/972,593

(22) Filed: May 7, 2018

(65) Prior Publication Data

US 2018/0338091 A1    Nov. 22, 2018

(30) Foreign Application Priority Data

May 16, 2017   (JP) ................. 2017-097226

(51) Int. Cl.
*H04N 5/232* (2006.01)
*H04N 5/262* (2006.01)

(52) U.S. Cl.
CPC ..... *H04N 5/23296* (2013.01); *H04N 5/23216* (2013.01); *H04N 5/23238* (2013.01); *H04N 5/23293* (2013.01); *H04N 5/2628* (2013.01)

(58) Field of Classification Search
CPC .......... H04N 5/23296; H04N 5/2628; H04N 5/23216; H04N 5/23293; H04N 5/23238
See application file for complete search history.

(56) References Cited

U.S. PATENT DOCUMENTS

| 10,101,891 B1* | 10/2018 | Kulewski ............... G06T 3/00 |
| 2013/0101164 A1* | 4/2013 | Leclerc ............... G06T 11/00 |
| | | 382/103 |

FOREIGN PATENT DOCUMENTS

| JP | H01211793 A | 8/1989 |
| JP | H03145878 A | 6/1991 |
| JP | 2000217078 A | 8/2000 |
| JP | 2011034512 A | 2/2011 |

* cited by examiner

*Primary Examiner* — Yogesh K Aggarwal
(74) *Attorney, Agent, or Firm* — Rossi, Kimms & McDowell LLP

(57) ABSTRACT

A display control apparatus that is capable of improving a feeling of an operation that moves a partial area cropped from an output image. A cropping unit crops an image in a partial cropping area from an output image. A scaling unit generates an unevenly scaled image by scaling the output image or the cropped image in one direction. A switching unit switches between display of an unscaled image and display of the unevenly scaled image when the cropped image is displayed on a display unit. A control unit moves the cropping area to the output image in the direction by a moving amount per a single operation for moving the cropping area in the direction when the unscaled image is displayed, and moves the cropping area in the direction by a different moving amount per the single operation when the unevenly scaled image is displayed.

14 Claims, 7 Drawing Sheets

DISPLAY CONTROL APPARATUS DISPLAYING IMAGE, CONTROL METHOD THEREFOR, AND STORAGE MEDIUM STORING CONTROL PROGRAM THEREFOR

BACKGROUND OF THE INVENTION

Field of the Invention

The present invention relates to a display control apparatus that displays an image, a control method therefor, and a storage medium storing a control program therefor.

Description of the Related Art

There is a known image pickup apparatus equipped with a display device that crops a partial area of an image (hereinafter, referred to as an "output image") output from an image pickup device and displays an expanded image within the cropping area on the display device in order to check a focusing state (see Japanese Laid-Open Patent Publications (Kokai) No. 2000-217078 (JP 2000-217078A), No. 2011-34512 (JP 2011-34512A), and No. H01-211793 (JP H01-211793A)). In this case, since a part of the output image is displayed on the display device, a user is able to display a desired area within the output image on the display device by moving the position of the cropping area from the output image.

Moreover, there is a known image pickup apparatus that captures an image while inserting an anamorphic lens that optically compresses an object image in one direction into an optical path (see Japanese Laid-Open Patent Publication (Kokai) No. H03-145878 (JP H03-145878A)). The image pickup apparatus has a function to expand an output image compressed in one direction in the inverse direction of the compression direction and to display the expanded image on a display device.

The conventional technique has the following problem when a partial area is cropped from the output image compressed in the horizontal direction and when an image that is obtained by expanding the cropping area in the horizontal direction is displayed. That is, a moving amount of the expanded image on the display device per one operation becomes larger (coarser) in the horizontal direction than a moving amount of a cropped image that is not expanded on the display device per one operation. This lowers an operational feeling of moving an area. Moreover, the moving amount of the expanded image on the display device in the horizontal direction when the cropping area within the output image is moved is different from that in a vertical direction. This gives a user an uncomfortable feeling about the operation that moves the image displayed on the display device.

SUMMARY OF THE INVENTION

The present invention provides a technique that is capable of improving a feeling of an operation that moves a partial area cropped from an output image in a case where an unevenly scaled image that is obtained by expanding or reducing the partial area in a predetermined direction is displayed on a display device.

Accordingly, a first aspect of the present invention provides a display control apparatus including a cropping unit configured to crop an image in a partial cropping area from an output image, a scaling unit configured to generate an unevenly scaled image by scaling either one of the output image and the cropped image in a predetermined direction, a switching unit configured to switch between display of an unscaled image that is not scaled in the predetermined direction and display of the unevenly scaled image in a case where the cropped image is displayed on a display unit, and a control unit configured to move the cropping area to the output image in the predetermined direction by a first moving amount per a single predetermined operation for moving the cropping area in the predetermined direction in a case where the unscaled image is displayed on the display unit, and to move the cropping area to the output image in the predetermined direction by a second moving amount that is different from the first moving amount per the single predetermined operation in a case where the unevenly scaled image is displayed on the display unit.

Accordingly, a second aspect of the present invention provides a control method for a display control apparatus, the control method including cropping an image in a partial cropping area from an output image, generating an unevenly scaled image by scaling either one of the output image and the cropped image in a predetermined direction, switching between display of an unscaled image that is not scaled in the predetermined direction and display of the unevenly scaled image in a case where the cropped image is displayed on a display unit, moving the cropping area to the output image in the predetermined direction by a first moving amount per a single predetermined operation for moving the cropping area in the predetermined direction in a case where the unscaled image is displayed on the display unit, and moving the cropping area to the output image in the predetermined direction by a second moving amount that is different from the first moving amount per the single predetermined operation in a case where the unevenly scaled image is displayed on the display unit.

Accordingly, a third aspect of the present invention provides a non-transitory computer-readable storage medium storing a control program causing a computer to execute the control method of the second aspect.

The present invention improves a feeling of an operation that moves a partial area cropped from an output image in a case where an unevenly scaled image that is obtained by expanding or reducing the partial area in a predetermined direction is displayed on a display device.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings. An image pickup apparatus equipped with a display device is described as an example of the display control apparatus according to the present invention in the embodiments.

Figure 1:
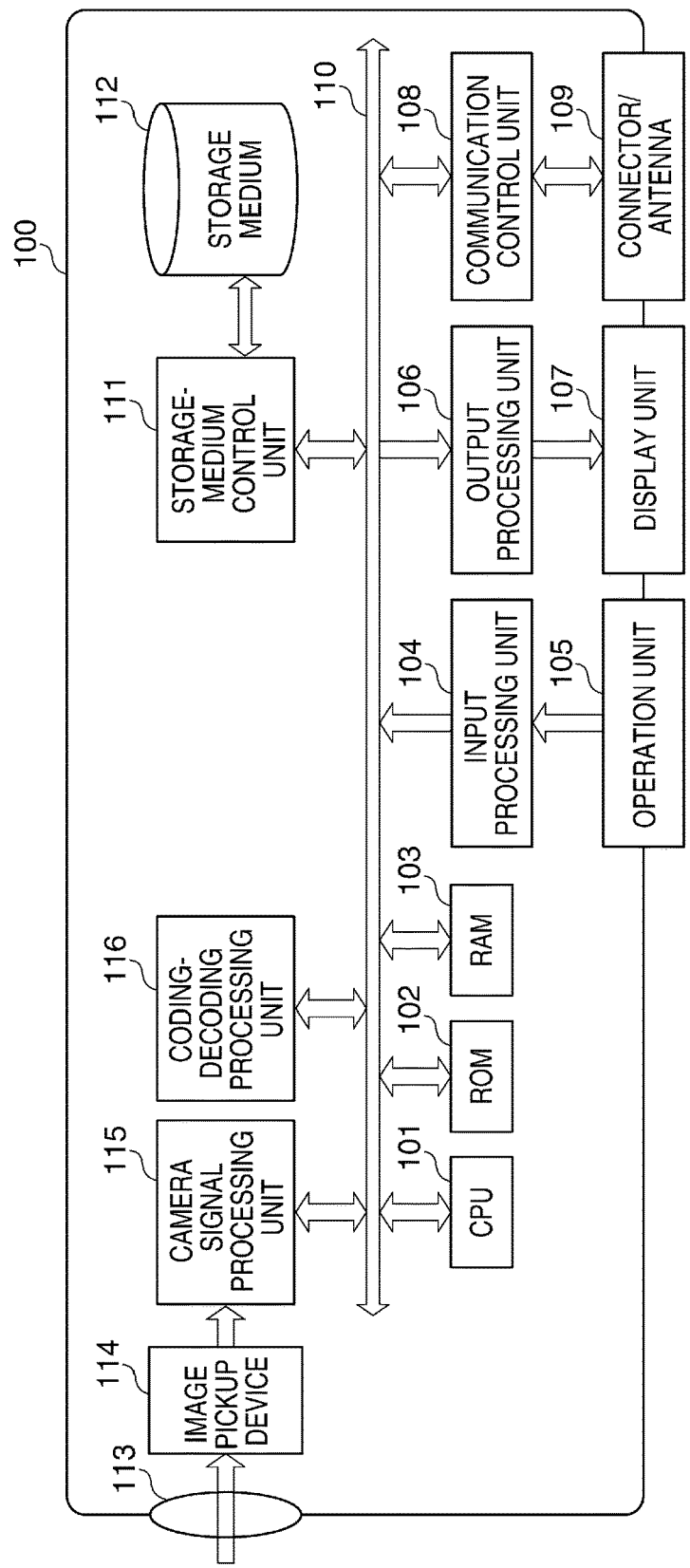
FIG. 1 is a block diagram schematically showing a configuration of an image pickup apparatus as a display control apparatus according to embodiments of the present invention.

FIG. 1 is a block diagram schematically showing a configuration of the image pickup apparatus 100. The image pickup apparatus 100 is provided with a CPU 101, a ROM 102, a RAM 103, an input processing unit 104, an operation unit 105, an output processing unit 106, a display unit 107, a communication control unit 108, connector-and-antenna 109, and an internal bus 110. Moreover, the image pickup apparatus 100 is provided with a storage medium control unit 111, a storage medium 112, an image pickup optical system 113, an image pickup device 114, a camera signal processing unit 115, and a cording-decoding processing unit 116.

The internal bus 110 connects the components constituting the image pickup apparatus 100 so that communications will be available. The ROM 102 stores various programs that the CPU 101 executes in order to control operations of the image pickup apparatus 100 and data. The ROM 102 may be a flash memory. The RAM 103 has a working area to which the programs are developed and an area that temporarily stores variables and working data that are needed when the CPU 101 performs various calculations. The CPU 101 controls the entire image pickup apparatus 100 by developing a program read from the ROM 102 or the storage medium 112 to the working area of the RAM 103 and by running the program to control the components of the image pickup apparatus 100.

The image pickup optical system 113 is provided with a lens and a diaphragm, and forms an image on an image pickup surface of the image pickup device 114 using incident light from an object. In the embodiments, the image pickup optical system 113 is arranged in a lens barrel that is detachable from a body of the image pickup apparatus 100. However, the image pickup optical system 113 may be arranged in a lens barrel that unites with the body. The image pickup device 114 is a photoelectric conversion element that converts the optical image formed on the image pickup surface into an analog electric signal. Specifically, the device 114 is a CCD sensor or a CMOS sensor. In the embodiments, the image pickup device 114 includes an A/D converter, converts the generated analog electric signal into a digital signal, and outputs it to the camera signal processing unit 115. The camera signal processing unit 115 applies various correction processes, such as a pixel interpolation process, a resizing process, and a color conversion process, to the digital signal obtained from the image pickup device 114.

The coding-decoding processing unit 116 compresses and encodes the digital signal processed by the camera signal processing unit 115 at a predetermined bit rate and format, and decodes compression coded image data to the contrary. It should be noted that the image pickup apparatus 100 is provided with a microphone and a loudspeaker that are not shown. When a video image (movie) is captured, sound is recorded simultaneously, and the coding-decoding processing unit 116 generates video data with sound by multiplexing a video signal and a sound signal. The coding-decoding processing unit 116 decodes the video data with sound, and the video image is reproduced and displayed on the display unit 107 and the sound is reproduced and output from the loudspeaker.

The input processing unit 104 receives a user's operation through the operation unit 105, generates a control signal corresponding to the user's operation, and supplies it to the CPU 101. The operation unit 105 is an input device that receives a user's operation, and has a touch panel provided in the display unit 107, an instruction button for starting execution of various processes, and a cross joint button for moving an image displayed on the display unit 107. It should be noted that the operation unit 105 includes a remote operatable device like an infrared remote controller. The output processing unit 106 generates various kinds of display data according to instructions from the CPU 101, and supplies them to the display unit 107. Accordingly, a GUI is displayed on the display unit 107 and an image (video image) is displayed. The display unit 107 includes a liquid crystal panel and an electronic view finder. It should be noted that the display unit 107 may be a monitor connected to the image pickup apparatus 100 through the connector-and-antenna 109.

The storage media 112 is a semiconductor memory like a memory card or an HDD, and stores static image data, video image (movie) data, various application programs executable in the image pickup apparatus 100, and data required when the CPU 101 executes the various programs. The storage medium 112 may be built in the image pickup apparatus 100, may be detachable from the body of the image pickup apparatus 100, and may be connected to the body of the image pickup apparatus 100 via a cable so that communications will be available. The storage medium control unit 111 writes data to the storage medium 112 and reads it according to instructions from the CPU 101. The connector-and-antenna 109 enables communications with an external device by a wireless or wired communication. The communication control module 108 controls transmission and reception of the various kinds of data via the connector-and-antenna 109.

Next, an image process and display control in the image pickup apparatus 100 will be described. The image pickup optical system 113 of the image pickup apparatus 100 includes an anamorphic lens that optically compresses an object image into ½ in the horizontal direction. An image output from the image pickup device 114 (hereinafter referred to as an "output image") is an image in which the object image is compressed into ½ in the horizontal direction. It should be noted that an output image means a frame image constituting a video image that is continuously output from the image pickup device 114 when an object image captured by the image pickup device 114 is stored in the storage medium 112 as a video image (movie) or when a user watches the image without storing.

Hereinafter, crop display of an output image and expanded display of an unevenly scaled image will be described. In this specification, "uneven scaling" means a process that transforms the entirety or a part of an output image so as to counteract an image compression result of an anamorphic lens. Moreover, an unevenly scaled image means an unevenly expanded image or an unevenly reduced image. An example of an unevenly scaled image that is obtained by unevenly scaling an output image compressed into ½ in the horizontal direction is an unevenly expanded image that is obtained by expanding (extending) the entirety or a cropped part of the output image twice in the horizontal direction. Moreover, another example of an unevenly scaled image is an unevenly reduced image that is obtained by reducing (compressing) the entirety or a cropped part of the output image ½ in the vertical direction. In the crop display of an output image, a partial area cropped from the output image rather than the entire output image is displayed on the display unit 107. Similarly, in the expanded display of the unevenly scaled image, a partial area cropped from the unevenly scaled image rather than the entire unevenly scaled image is displayed on the display unit 107. It should be noted that "uneven scaling" in the present invention means expanding or reducing of an output image so that a magnification in the horizontal direction will differ from a magnification in the vertical direction, and does not include expanding or reducing of an output image so that the magnification in the horizontal direction will be the same as the magnification in the vertical direction. Moreover, an "unevenly scaled image" in the present invention means an image that is obtained by expanding or reducing an output image so that a magnification in the horizontal direction will differ from a magnification in the vertical direction, and does not include an image that is obtained by expanding or reducing an output image so that the magnification in the horizontal direction will be the same as the magnification in the vertical direction.

Figure 2A:
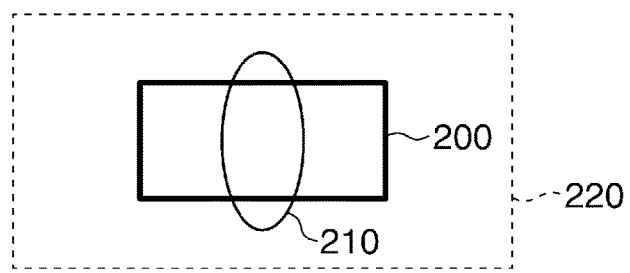
FIG. 2A and FIG. 2B are views for describing a relation between an output image, an unevenly scaled image, and a cropping area according to a first embodiment.

Hereinafter, crop display of an output image and expanded display of an unevenly scaled image according to a first embodiment will be described. FIG. 2A is a view for describing crop display of an output image in the first embodiment, and schematically shows a relation between the output image 200 and one example of a cropping area 200 that is cropped from the output image 220. The output image 220 is an image that is entirely compressed into ½ in the horizontal direction by the anamorphic lens. An ellipse in the output image 220 schematically shows a main object 210 compressed into ½ in the horizontal direction.

Cropping of an image is executable by an operation to the operation unit 105. In the crop display of the output image 220, an image within a cropping area 200 set at a predetermined position in the output image 220 is cropped first. The cropped image is expanded by the camera signal processing unit 115 if needed according to the specification of the display unit 107, and is displayed on the display unit 107.

A user is able to move the cropping area 200 within the output image 220 by changing a signal input into the camera signal processing unit 115 by an operation to the operation unit 105, for example. Moreover, the size of the cropping area 200 is set so as to enable movement in both the horizontal and vertical directions in the output image 220 by an operation to the operation unit 105. In other words, the size of the cropping area 200 will not be set so as to enable movement in only one of the horizontal and vertical directions. Although the horizontal and vertical lengths of the cropping area 200 shown in FIG. 2A are respectively set to ½ of the horizontal and vertical lengths of the output image 220, they are not limited to this.

A vertical moving amount of the cropping area 200 to the output image 220 per a single predetermined operation to the operation unit 105 is equal to a horizontal moving amount per the single predetermined operation (hereinafter referred to as a "first moving amount"). Since the vertical and horizontal moving amounts of the image displayed on the display unit 107 corresponding to the vertical and horizontal movements of the cropping area 200 to the output image 220 are equal to each other, there is no uncomfortable feeling in the moving operations. The single predetermined operation to the operation unit 105 may be a vertical moving operation or a horizontal moving operation given by pressing each end of the cross joint button, for example. The operation is not limited to this.

It should be noted that the image signal that is output from the image pickup device 114 and is not cropped is sent to the coding-decoding processing unit 116 through the camera signal processing unit 115 in a case where the output image 220 is stored while performing the crop display from the output image 220. The coding-decoding processing unit 116 compresses and encodes the obtained image signal and stores it to the storage medium 112. Accordingly, the image cropped by the cropping area 200 is not stored to the storage medium 112.

Figure 2B:
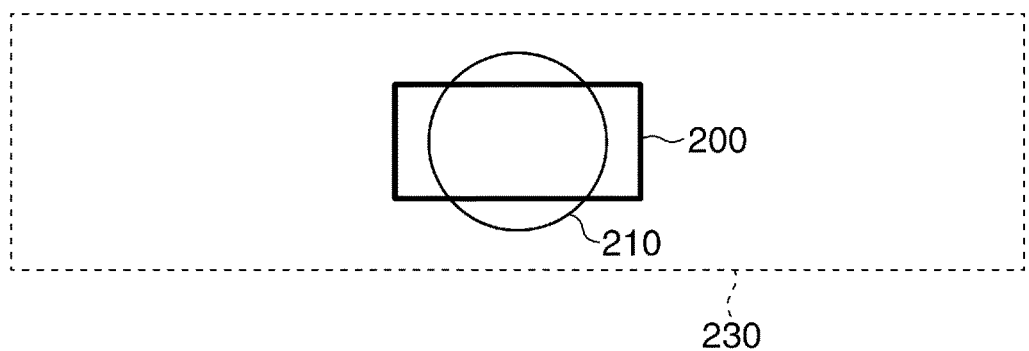

Next, a process that generates an unevenly scaled image 230 by expanding (extending) the entire output image 200 twice in the horizontal direction as shown in FIG. 2B, crops a partial cropping area 200 from the generated unevenly scaled image, and displays it on the display unit 107 will be described as a first method of the expanded display of the unevenly scaled image. A circle in the unevenly scaled image 230 shows the main object 210 schematically.

The first method is performed in the same manner as the crop display of the output image 220 mentioned above. That is, an image in the cropping area 200 that is set at a predetermined position in the unevenly scaled image 230 is cropped from the unevenly scaled image 230 first. The cropped image is expanded by the camera signal processing unit 115 if needed according to the specification of the display unit 107, and is displayed on the display unit 107.

The size of the cropping area 200 is set so as to enable movement in both the horizontal and vertical directions in the unevenly scaled image 230 by a predetermined operation to the operation unit 105. An image process by the CPU 101 and the camera signal processing unit 115 sets and moves the cropping area 200 in the unevenly scaled image 230. For example, the CPU 101 sets the cropping area 200 according to instructions from the operation unit 105 in the unevenly scaled image 230 generated by the camera signal processing unit 115, and the camera signal processing unit 115 crops an image within the cropping area 200.

It is preferable that a moving amount of an image on the display unit 107 corresponding to the single predetermined operation to the operation unit 105 do not change even if the crop display of the output image 220 and the expanded display of the unevenly scaled image 230 are switched. The unevenly scaled image 230 is obtained by expanding the output image 220 only in the horizontal direction, and is not expanded in the vertical direction. Accordingly, the moving amount in the vertical direction of the cropping area 200 in the unevenly scaled image 230 per the single predetermined operation to the operation unit 105 is equal to the moving amount in the vertical direction of the cropping area 200 to the output image 220, and is set to the first moving amount.

If the moving amount of the image displayed on the display unit 107 corresponding to movement of the cropping area 200 in the unevenly scaled image 230 in the vertical direction is different from that in the horizontal direction, change (movement) of the image will become distorted. Accordingly, it is necessary that the moving amount of the cropping area 200 in the unevenly scaled image 230 in the horizontal direction per the single predetermined operation to the operation unit 105 be equal to the first moving amount. In other words, it is necessary to prevent the moving amount of the cropping area 200 in the unevenly scaled image 230 in the horizontal direction per the single predetermined operation to the operation unit 105 from becoming twice the first moving amount due to uneven scaling of the output image 220. Accordingly, the CPU 101 controls so that the moving amount of the cropping area 200 in the unevenly scaled image 230 in the horizontal direction per the single predetermined operation to the operation unit 105 will be equal to the first moving amount Since the above-mentioned first method unevenly scales a plurality of entire output images 220 continuously, arithmetic loads on the CPU 101 and the camera signal processing unit 115 tend to become large, and memory capacity required for the RAM 103 also tends to become large. Moreover, when a user desires to record a partial area of the output image 220 instead of the entire output image 220, only the partial area to be recorded is displayed, so that the user is able to check the image in the area to be recorded. Accordingly, a second method of the expanded display of the unevenly scaled image that reduces increase of the arithmetic loads will be described hereinafter.

The second method crops an image in a partial area from the output image 220, generates an unevenly scaled image by expanding (extending) the cropped area twice only in the horizontal direction, and displays the generated image on the display unit 107. At the time, it is preferable that the vertical length of the cropping area set in the output image 220 be equal to the vertical length of the cropping area 200 shown in FIG. 2A and the horizontal length of the cropping area become ½ of the horizontal length of the cropping area 200 shown in FIG. 2A. This gives the same display state as the case where the first method is performed. Moreover, when the crop display of an output image and the expanded display of an unevenly scaled image are switched, an image on the display unit 107 varies only in the horizontal direction, and does not vary in the vertical direction. However, the shape of the cropping area is able to be set to a desired shape corresponding to the area that the user wants to expand and display, and is not limited to the above-mentioned shape.

Since the setting and movement of the position of the cropping area to the output image 220 in the expanded display of the unevenly scaled image are performed in the same manner as the setting and movement of the cropping area 200 to the output image 220, the description thereof is omitted. The moving amount of the cropping area to the output image 220 in the vertical direction per the single predetermined operation to the operation unit 105 is set to the first moving amount as with the crop display of the output image 220. In the meantime, the moving amount of the cropping area to the output image 220 in the horizontal direction per the single predetermined operation to the operation unit 105 is set to a second moving amount that is obtained by dividing the first moving amount by the magnification (2 times) in the horizontal direction. Since the vertical and horizontal moving amounts of the image that is cropped from the output image 220 while moving the cropping area to the output image 220, is unevenly scaled, and is displayed on the display unit 107 are equal to each other, there is no uncomfortable feeling in the moving operations.

It should be noted that the CPU 101 does not store the unevenly scaled image to the storage medium 112 even when either of the first method or the second method is employed. When storing the entire output image 220, the CPU 101 sends the coding-decoding processing unit 116 the image signal of the output image 220 before scaling and cropping regardless of the first method or the second method. Moreover, when storing only a partial area of the output image 220 according to the second method, the CPU 101 sends the coding-decoding processing unit 116 the image signal of the cropping area 200 in the output image 220. The coding-decoding processing unit 116 compresses and encodes the obtained image signal and stores it to the storage medium 112.

Figure 3:
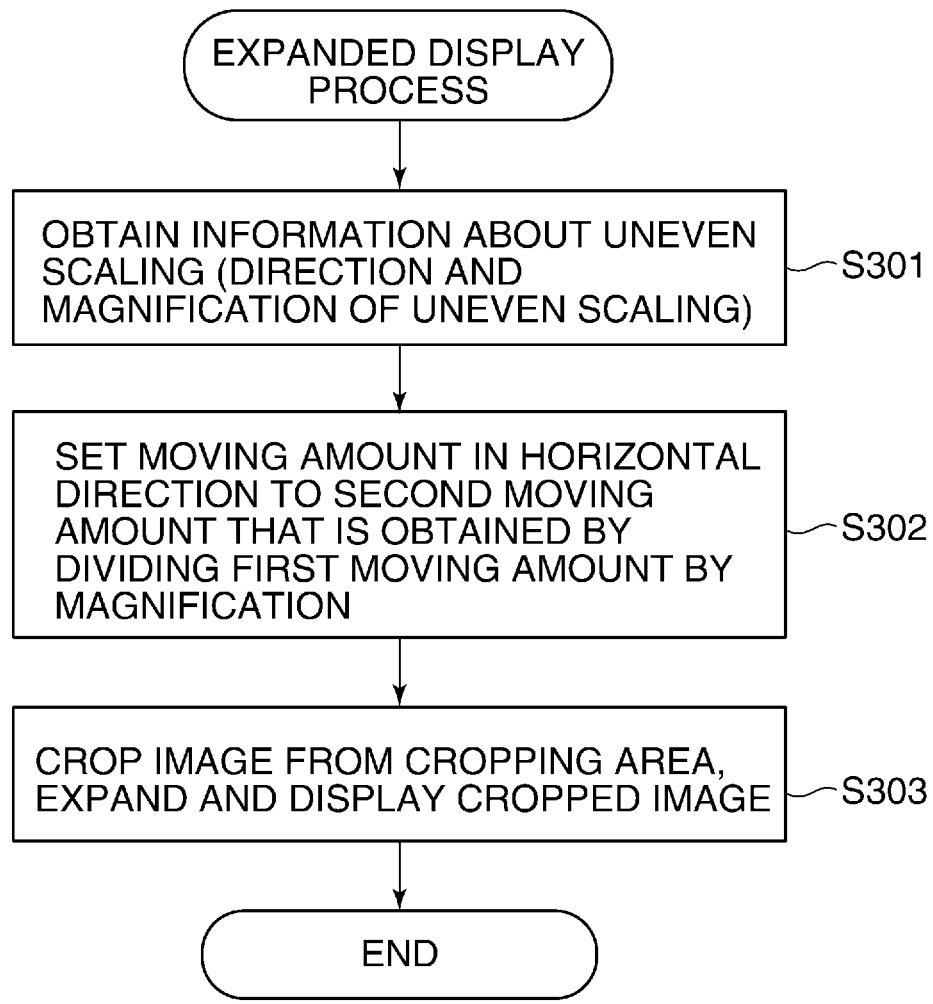
FIG. 3 is a flowchart showing an expanded display process for an unevenly scaled image according to the first embodiment.

FIG. 3 is a flowchart showing a process that achieves expanded display of an unevenly scaled image by unevenly scaling a partial area cropped from the output image 220 (the second method of expanded display of an unevenly scaled image). Each process indicated by an S-number in the flowchart in FIG. 13 is achieved, when the CPU 101 develops a predetermined program stored in the ROM 102 to the RAM 103 and controls operations of parts of the image pickup apparatus 100. The expanded display of an unevenly scaled image is started by a user's operation to the operation unit 105 that activates two processes including the crop display of an output image and the uneven scaling. When the anamorphic lens is detachably inserted and the image pickup apparatus 100 has a sensor that detects insertion of the anamorphic lens, the apparatus may be configured to start the expanded display of an unevenly scaled image automatically in a case where the sensor detects the insertion of the anamorphic lens.

In S301, the CPU 101 obtains information about the uneven scaling (i.e., a direction and a magnification of the uneven scaling (twice in the horizontal direction, for example)) on the basis of an optical property of the anamorphic lens that is obtained by a user's input through the operation unit 105 or by the communication with the lens barrel. In S302, the CPU 101 calculates the second moving amount by dividing the first moving amount by the magnification (2 times) and sets the moving amount of the cropping area to the output image 220 in the horizontal direction to the second moving amount. It should be noted that the moving amount of the cropping area to the output image 220 in the vertical direction is maintained as the first moving amount.

In S303, the CPU 101 crops the image from the cropping area set in the output image 220 and displays the image that is obtained by expanding the cropped image twice in the horizontal direction on the display unit 107. When the expanded display of the unevenly scaled image in S303 is terminated, this process is finished. When the operation unit 105 is operated so as to terminate only the uneven scaling while the unevenly scaled image is expanded and displayed, the CPU 101 executes the crop display of the output image described with reference to FIG. 2A (it is not shown in FIG. 3). At the time, the CPU 101 changes the moving amount of the cropping area 200 to the output image 220 in the horizontal direction to the first moving amount from the second moving amount. The termination of the expanded display of the unevenly scaled image may be determined when detachment of the anamorphic lens is automatically detected.

Figure 4:
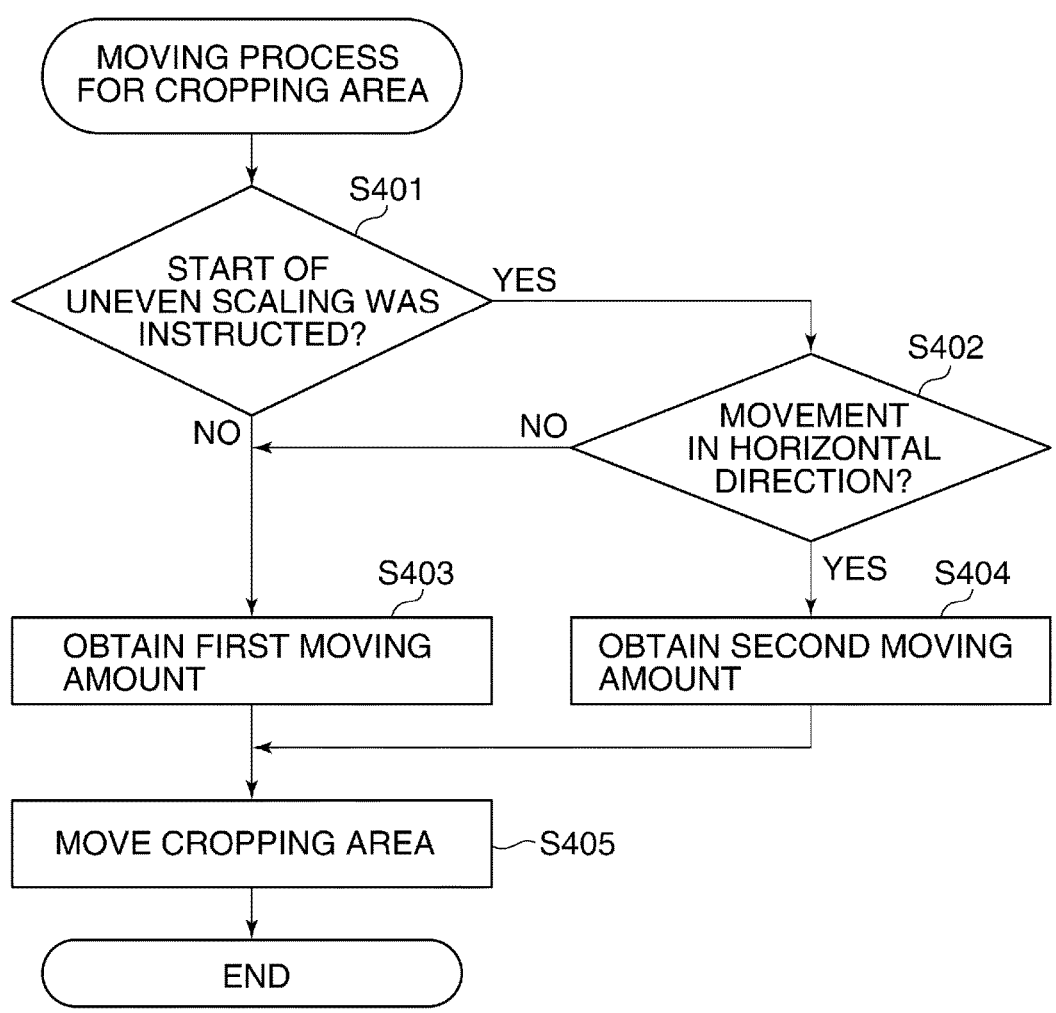
FIG. 4 is a flowchart showing a moving process for the cropping area in the output image according to the first embodiment.

FIG. 4 is a flowchart showing a moving process for the cropping area in to the output image 220. Each process indicated by an S-number in the flowchart in FIG. 4 is achieved, when the CPU 101 develops a predetermined program stored in the ROM 102 to the RAM 103 and controls operations of parts of the image pickup apparatus 100. As described with reference to FIG. 2A, the crop display of the output image 220 shall be performed before starting S401. Accordingly, the first moving amount is set to the moving amount of the cropping area to the output image 220 per the single predetermined operation to the operation unit 105 in each of the vertical direction and the horizontal direction.

In S401, the CPU 101 determines whether start of uneven scaling (start of the expanded display of an unevenly scaled image) was instructed. The uneven scaling is started by a user's operation that activates the uneven scaling to the operation unit 105, for example. When determining that there was a start instruction for the uneven scaling (YES in S401), the CPU 101 proceeds with the process to S402. When determining that there was not a start instruction for the uneven scaling (NO in S401), the CPU 101 proceeds with the process to S403. In S402, the CPU 101 determines whether the movement of the cropping area is in the horizontal direction. When determining that it is not horizontal movement (it is vertical movement, NO in S402), the CPU 101 proceeds with the process to S403. When determining that it is horizontal movement (YES in S402), the CPU 101 proceeds with the process to S404.

In S403, the CPU 101 obtains the first moving amount as the moving amount of the cropping area. Then, in S404, the CPU 101 obtains the second moving amount calculated in S302 as the moving amount of the cropping area. In S405, the CPU 101 moves the cropping area in the predetermined direction with the moving amount obtained in S403 or S404. This changes the cropping position from the signals inputted from the image pickup device 114, so that the image displayed on the display unit 107 moves.

The CPU 101 always determines whether termination of the crop display of the output image is instructed (it is not shown in the flowchart in FIG. 4), When determining that the termination of the crop display of the output image is not instructed, the CPU 101 returns the process to S401 and executes the processes S401 through S405 continuously. In the meantime, when determining that the termination of the crop display of the output image is instructed, the CPU 101 finishes this process. It should be noted that continuous operations for moving the cropping area to the operation unit 105 move the cropping area continuously, in the process of the flowchart in FIG. 4. This enables long-distance movement of the cropping area easily.

The above-mentioned description assumes that the output image or the unevenly scaled image in the cropping area is displayed. In the meantime, the output image in the cropping area may be scaled in accordance with resolution of a display device and displayed. In this case, when the uneven scaling is not activated, the output image is expanded or reduced at the common magnification in both the vertical and horizontal directions and displayed. When the unevenly scaling is activated, an image that is obtained by expanding or reducing the unevenly scaled image at a common magnification in both the vertical and horizontal directions and displayed may be displayed, or an equivalent image may be obtained by expanding or reducing the output image at different magnifications in the vertical and horizontal directions. That is, the expanded or reduced unevenly scaled image for displaying is obtained by applying an expansion or reduction process once at the magnifications that are calculated by multiplying the magnifications in the vertical and horizontal directions for obtaining the unevenly scaled image and the common magnification in both the vertical and horizontal directions.

Figure 5A:
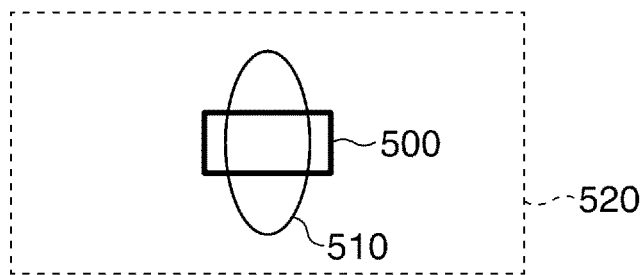
FIG. 5A and FIG. 5B are views for describing a relation between an output image, an unevenly scaled image, and a cropping area according to a second embodiment.

Hereinafter, crop display of an output image and expanded display of an unevenly scaled image according to a second embodiment will be described. FIG. 5A is a view for describing crop display of an output image in the second embodiment, and schematically shows a relation between the output image 520 and a cropping area 500. An ellipse in the output image 520 shows a main object 510 schematically. The horizontal and vertical lengths of the cropping area 500 are respectively set as one fourth of the horizontal and vertical lengths of the output image 520.

The output image 520 corresponds to the output image 220 shown in FIG. 2A. Since setting and movement of the cropping area 500 to the output image 520 are the same as that of the cropping area 200 to the output image 220 described in the first embodiment, their descriptions are omitted. It should be noted that the moving amount of the cropping area 500 to the output image 520 in each of the vertical and horizontal directions per the single predetermined operation to the operation unit 105 is set to the first moving amount as with the first embodiment. Moreover, since the cropping area 500 is displayed on the display unit 107 in the same manner as the first embodiment, its description is omitted.

Figure 5B:
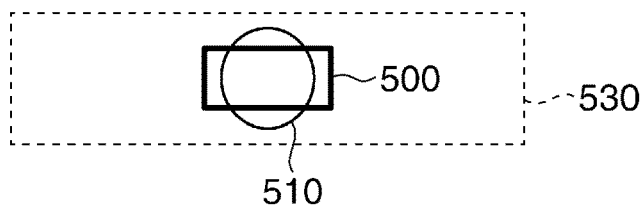

FIG. 5B is a view schematically showing a relation between an unevenly scaled image 530, which is obtained by reducing (compressing) the entire output image 520 to ½ in the vertical direction, and the cropping area 500 that is set in the unevenly scaled image 530. A circle in the unevenly scaled image 530 shows the main object 510 schematically. In contrast to FIG. 2B in which the entire output image 220 is expanded twice in the horizontal direction, the entire output image 520 is reduced to ½ in the vertical direction in FIG. 5B.

A first method of the expanded display of the unevenly scaled image 530 generates the unevenly scaled image 530 by reducing the output image 520 to ½ in the vertical direction, crops an image in the cropping area 500 from the generated unevenly scaled image 530, and displays the cropped image on the display unit 107. A second method of the expanded display of the unevenly scaled image 530 crops a partial area from the output image 520, reduces the cropped area to ½ only in the vertical direction, and displays the reduced image on the display unit 107. Since these methods are the same as the methods of the expanded display of the unevenly scaled image described with reference to FIG. 2B, detailed descriptions are omitted.

When the second method is used, it is preferable that the vertical length of the cropping area set in the output image 520 be twice the vertical length of the cropping area 500 shown in FIG. 5A and the horizontal length of the cropping area be equal to the horizontal length of the cropping area 500 shown in FIG. 5A. Accordingly, an image that is obtained by unevenly scaling the cropped image has the same size as the cropping area 500 shown in FIG. 5B. Moreover, in the case where the second method is used, the moving amount of the cropping area to the output image 520 in the horizontal direction per the single predetermined operation to the operation unit 105 is settable to the first moving amount as with the crop display of the output image 520. In the meantime, the moving amount of the cropping area to the output image 520 in the vertical direction per the single predetermined operation to the operation unit 105 is set to a second moving amount that is obtained by dividing the first moving amount by 0.5 times that is a horizontal compression ratio of the anamorphic lens (multiplying the first moving amount twice). Since the vertical and horizontal moving amounts of the image that is cropped from the output image 520 while moving the cropping area to the output image 520, is unevenly scaled, and is displayed on the display unit 107 are equal to each other, there is no uncomfortable feeling in the moving operations.

Figure 6:
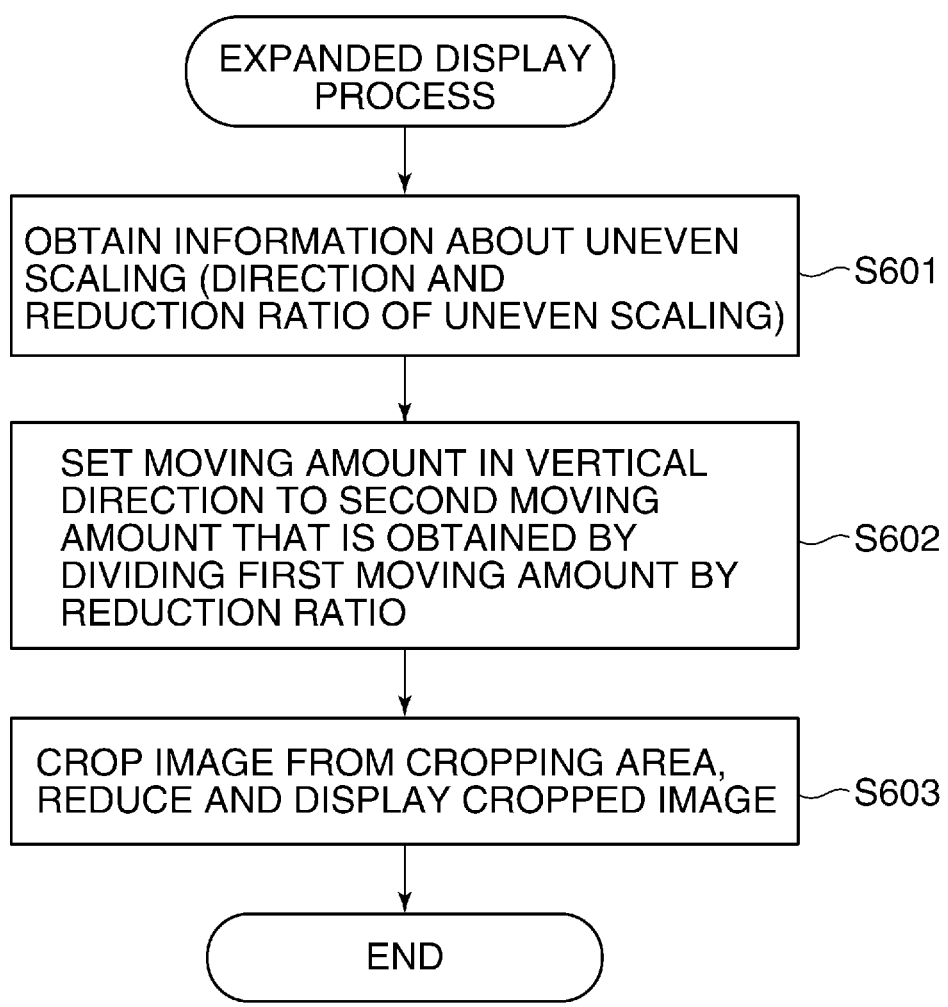
FIG. 6 is a flowchart showing an expanded display process for an unevenly scaled image according to the second embodiment.

FIG. 6 is a flowchart showing a process that achieves expanded display of an unevenly scaled image by unevenly scaling a partial area cropped from the output image 520. Each process indicated by an S-number in the flowchart in FIG. 6 is achieved, when the CPU 101 develops a predetermined program stored in the ROM 102 to the RAM 103 and controls operations of parts of the image pickup apparatus 100. Since start and end of the expanded display of an unevenly scaled image are the same as the start and end of the expanded display of the unevenly scaled image described about the flowchart in FIG. 3, detailed descriptions are omitted.

In S601, the CPU 101 obtains information about the uneven scaling (i.e., a direction and reduction ratio of the uneven scaling (0.5 times in the vertical direction, for example)) on the basis of an optical property of the anamorphic lens that is obtained by a user's input through the operation unit 105 or by the communication with the lens barrel. In S602, the CPU 101 calculates the second moving amount by dividing the first moving amount by the reduction ratio (0.5 times) (multiplying the first moving amount twice). and sets the moving amount of the cropping area to the output image 520 in the vertical direction to the second moving amount. It should be noted that the moving amount of the cropping area to the output image 220 in the horizontal direction is set to the first moving amount in S602. In S603, the CPU 101 crops the image from the cropping area set in the output image 520 and displays the image that is obtained by reducing the cropped image to ½ in the vertical direction on the display unit 107. When the process in S603 is terminated, this process is finished.

Figure 7:
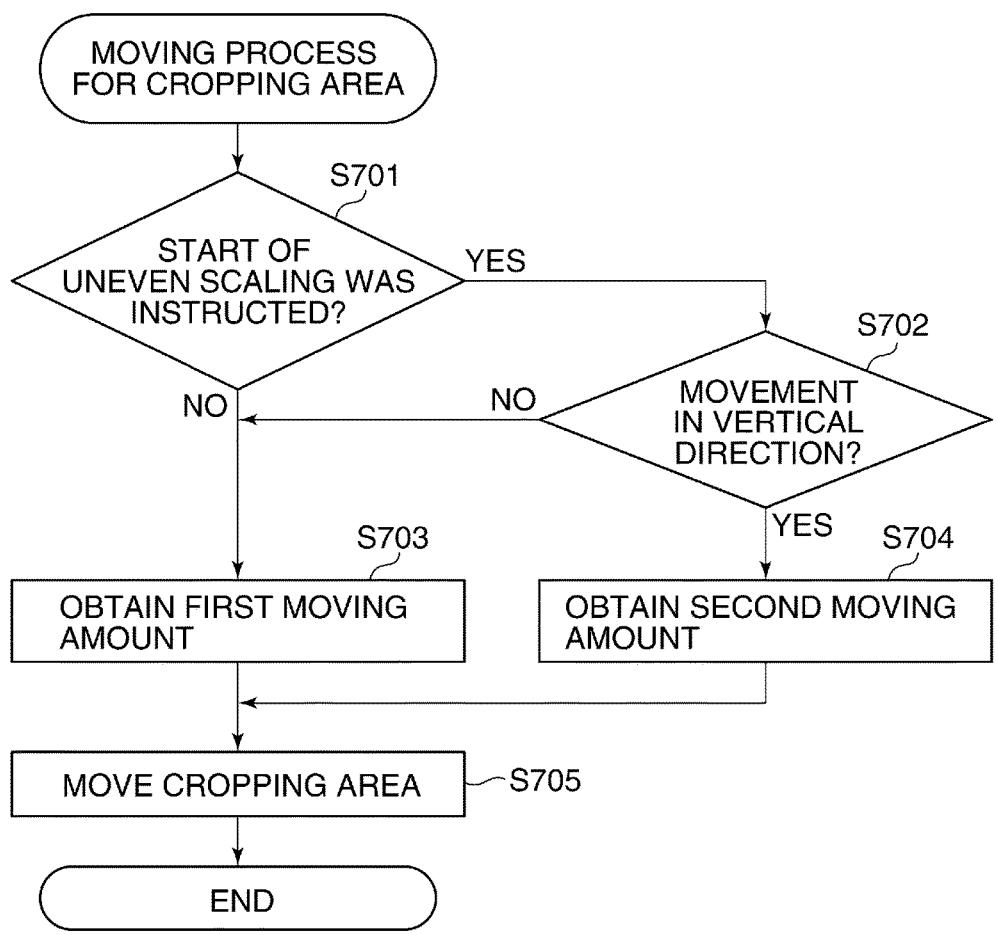
FIG. 7 is a flowchart showing a moving process for the cropping area in the output image according to the second embodiment.

FIG. 4 is a flowchart showing a moving process for the cropping area to the output image 520. Each process indicated by an S-number in the flowchart in FIG. 7 is achieved, when the CPU 101 develops a predetermined program stored in the ROM 102 to the RAM 103 and controls operations of parts of the image pickup apparatus 100. As described with reference to FIG. 5A, the crop display of the output image 520 shall be performed before starting S701. Since contents of processes in S701, S703, S704, and S705 are the same as the contents of process in S401, S403, S404, and S405 in the flowchart in FIG. 4, respectively, their descriptions are omitted.

When determining that there was a start instruction for the uneven scaling (YES in S701), the CPU 101 determines whether movement of the cropping area is in the vertical direction in S702. When determining that it is not vertical movement (it is horizontal movement, NO in S702), the CPU 101 proceeds with the process to S703. When determining that it is vertical movement (YES in S702), the CPU 101 proceeds with the process to S704. Since the vertical and horizontal moving amounts of the image that is displayed on the display unit 107 when the cropping area is moved to the output image 520 during the reduced display of the unevenly scaled image are equal to each other, there is no uncomfortable feeling in the moving operations.

As described with reference to FIG. 2 through FIG. 7, a partial area is cropped from an output image that is compressed in one direction, and an image that is obtained by unevenly scaling the cropped image at a predetermined magnification is displayed on the display unit 107 in the above-mentioned embodiments. Then, when the cropping area in the output image is moved in order to move the image displayed on the display unit 107, the moving amount of the cropping area is set up on the basis of the compression ratio and direction of the output image so that the moving amounts in the vertical and horizontal directions will be equal to each other. This prevents an uncomfortable feeling from generating in the operation that moves the image displayed on the display unit 107.

Although the above-mentioned embodiments describe the case where the image pickup optical system 113 has the anamorphic lens that compresses an image into ½ in the horizontal direction, the image compression ratio of the anamorphic lens is not limited to ½. Accordingly, when an anamorphic lens that compresses an image to m/n (m and n are natural numbers) in the horizontal direction is used, a magnification at the time of unevenly scaling the whole or a part of an output image in the horizontal direction becomes its reciprocal n/m, for example. Moreover, when the whole or a part of the output image is unevenly scaled in the vertical direction, it is enough to reduce at the same compression ratio m/n.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Furthermore, the embodiments mentioned above show examples of the present invention, and it is possible to combine the embodiments suitably. For example, the display control apparatus according to the present invention does not necessarily equip the image pickup unit (the image pickup optical system 113 and the image pickup device 114) integrally. That is, the image pickup unit may be located apart from the display control apparatus. In such a case, an image captured by the image pickup unit is sent to the display control apparatus through a predetermined communication line.

Moreover, the moving amount of the cropping area to the output image that is compressed in one direction is adjusted in the expanding direction or the reduction direction, and the moving amount in the direction intersecting perpendicularly with this is not changed in the above-mentioned embodiments. Accordingly, the moving amount of the image on the display unit 107 per the single operation to the operation unit 105 does not change, when the crop display to the output image and the expanded display or the reduced display of the unevenly scaled image are switched. In contrast to this, when an image cropped from the output image 220 is unevenly scaled in the horizontal direction in the example shown in FIG. 2A and FIG. 2B, the moving amount of the cropping area to the output image 220 in the horizontal direction may be the first moving amount, which is not changed, and that in the vertical direction may be a moving amount that is twice the first moving amount. In the same manner, when an image cropped from the output image 520 is unevenly scaled in the vertical direction in the example shown in FIG. 5A and FIG. 5B, the moving amount of the cropping area to the output image 520 in the vertical direction may be the first moving amount, which is not changed, and that in the horizontal direction may be a moving amount that is one half of the first moving amount. While the expanded display of the unevenly scaled image continues, the vertical and horizontal moving amounts of the image that is displayed on the display unit 107 and moved because of the movement of the cropping area to the output image are equal to each other. Although these methods change the moving amount of the image on the display unit 107 per the single operation to the operation unit 105 before and after switching the crop display of the output image and the expanded display of the unevenly scaled image, they are suitable for a use that enlarges or reduces the moving amount per the single operation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

This application claims the benefit of Japanese Patent Application No. 2017-097226, filed May 16, 2017, which is hereby incorporated by reference herein in its entirety.

What is claimed is:

1. A display control apparatus comprising:
a memory storing computer-readable instructions; and
a processor configured to execute the computer-readable instruction stored on the memory to function as:
a cropping unit configured to crop an image in a partial cropping area from an output image;
a scaling unit configured to generate an unevenly scaled image by scaling either one of the output image and the cropped image in a predetermined direction;
a switching unit configured to switch between display of an unscaled image that is not scaled in the predetermined direction and display of the unevenly scaled image in a case where an image of the cropping area is displayed on a display unit; and
a control unit configured to move the cropping area to the output image in the predetermined direction by a first moving amount per a single predetermined operation for moving the cropping area in the predetermined direction in a case where the unscaled image is displayed on the display unit, and to move the cropping area to the output image in the predetermined direction by a second moving amount that is different from the first moving amount per the single predetermined operation in a case where the unevenly scaled image is displayed on the display unit.

2. The display control apparatus according to claim 1, wherein the scaling unit generates an unevenly expanded image by expanding the image of the cropping area in the predetermined direction, and
wherein the control unit moves the cropping area to the output image by the second moving amount that is smaller than the first moving amount per the single predetermined operation in a case where the unevenly expanded image is displayed on the display unit.

3. The display control apparatus according to claim 1, wherein the scaling unit generates an unevenly reduced image by reducing the image of the cropping area in the predetermined direction, and
wherein the control unit moves the cropping area to the output image by the second moving amount that is larger than the first moving amount per the single predetermined operation in a case where the unevenly reduced image is displayed on the display unit.

4. The display control apparatus according to claim 1, wherein the control unit moves the cropping area to the output image in the predetermined direction by the second moving amount that is obtained by dividing the first moving amount by a scaling magnification per the single predetermined operation in the case where the unevenly scaled image is displayed on the display unit.

5. The display control apparatus according to claim 1, wherein the control unit moves the cropping area to the output image in a direction intersecting perpendicularly with the predetermined direction by the first moving amount per a single predetermined operation for moving the cropping area in the direction intersecting perpendicularly with the predetermined direction in the case where the unevenly scaled image is displayed on the display unit.

6. The display control apparatus according to claim 1, wherein the output image is a compressed image that is compressed at a predetermined compression ratio in the predetermined direction, and
wherein the unevenly scaled image is obtained by expanding the image of the cropping area at a magnification that is reciprocal of the compression ratio in the predetermined direction.

7. The display control apparatus according to claim 1, wherein the output image is a compressed image that is compressed at a predetermined compression ratio in the predetermined direction, and
wherein the unevenly scaled image is obtained by reducing the image of the cropping area at a reduction ratio equal to the predetermined compression ratio in a direction intersecting perpendicularly with the predetermined direction.

8. The display control apparatus according to claim 6, wherein the compressed image is generated by photoelectrically converting an optical image formed on an image pickup device through an image pickup optical system including an anamorphic lens by the image pickup device and is output.

9. The display control apparatus according to claim 7, wherein the compressed image is generated by photoelectrically converting an optical image formed on an image pickup device through an image pickup optical system including an anamorphic lens by the image pickup device and is output.

10. The display control apparatus according to claim 1, wherein the control unit moves the cropping area continuously, in a case where the predetermined operations are performed continuously.

11. The display control apparatus according to claim 1, wherein the output image is a frame image constituting a video image.

12. The display control apparatus according to claim 1, wherein the scaling unit generates the unevenly scaled image by scaling the image of the cropping area at different magnifications in the predetermined direction and a direction intersecting perpendicularly with the predetermined direction, and wherein the control unit moves the cropping area in the predetermined direction by the first moving amount per the single predetermined operation in a case where an image that is scaled at a common magnification in both the predetermined direction and the direction intersecting perpendicularly with the predetermined direction is displayed on the display unit, and moves the cropping area in the predetermined direction by the second moving amount per the single predetermined operation in a case where the unevenly scaled image that is scaled at the different magnifications in the predetermined direction and the direction intersecting perpendicularly with the predetermined direction is displayed on the display unit.

13. A control method for a display control apparatus, the control method comprising:

cropping an image in a partial cropping area from an output image;

generating an unevenly scaled image by scaling either one of the output image and the cropped image in a predetermined direction;

switching between display of an unscaled image that is not scaled in the predetermined direction and display of the unevenly scaled image in a case where an image of the cropping area is displayed on a display unit;

moving the cropping area to the output image in the predetermined direction by a first moving amount per a single predetermined operation for moving the cropping area in the predetermined direction in a case where the unscaled image is displayed on the display unit; and moving the cropping area to the output image in the predetermined direction by a second moving amount that is different from the first moving amount per the single predetermined operation in a case where the unevenly scaled image is displayed on the display unit.

14. A non-transitory computer-readable storage medium storing a control program causing a computer to execute a control method for a display control apparatus, the control method comprising:

cropping an image in a partial cropping area from an output image;

generating an unevenly scaled image by scaling either one of the output image and the cropped image in a predetermined direction;

switching between display of an unscaled image that is not scaled in the predetermined direction and display of the unevenly scaled image in a case where an image of the cropping area is displayed on a display unit;

moving the cropping area to the output image in the predetermined direction by a first moving amount per a single predetermined operation for moving the cropping area in the predetermined direction in a case where the unscaled image is displayed on the display unit; and moving the cropping area to the output image in the predetermined direction by a second moving amount that is different from the first moving amount per the single predetermined operation in a case where the unevenly scaled image is displayed on the display unit.

* * * * *